(12) United States Patent
Emmelmann et al.

(10) Patent No.: US 9,377,039 B2
(45) Date of Patent: Jun. 28, 2016

(54) FORCE INTRODUCTION FITTING FOR LIGHTWEIGHT COMPONENTS

(71) Applicant: Airbus Operations GmbH, Hamburg (DE)

(72) Inventors: Claus Emmelmann, Seevetal Horst (DE); Frank-Michael Klaukien, Ellerbek (DE); Jannis Kranz, Hamburg (DE); Eric Wycisk, Hamburg (DE); Jan Sassmannshausen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 221 days.

(21) Appl. No.: 14/057,090

(22) Filed: Oct. 18, 2013

(65) Prior Publication Data

US 2014/0079479 A1     Mar. 20, 2014

Related U.S. Application Data

(63) Continuation of application No. PCT/EP2012/057622, filed on Apr. 26, 2012.

(60) Provisional application No. 61/479,252, filed on Apr. 26, 2011.

(30) Foreign Application Priority Data

Apr. 26, 2011    (DE) .......................... 10 2011 018 526

(51) Int. Cl.
| | |
|---|---|
| *F16B 17/00* | (2006.01) |
| *F16B 5/01* | (2006.01) |
| *B64C 1/06* | (2006.01) |

(52) U.S. Cl.
CPC ... *F16B 5/01* (2013.01); *B64C 1/06* (2013.01); *Y10T 403/70* (2015.01)

(58) Field of Classification Search
CPC ............ F16B 5/01; F16B 5/004; F16B 5/002; F16B 7/0446; B64C 1/06; B64C 1/12; B64C 1/26; Y10T 403/70; Y10T 403/7001; Y10T 403/7039; Y10T 403/7043; Y10T 403/7049

USPC ............ 403/69, 94, 161, 345, 346, 361, 363, 403/366; 411/82, 258; 244/119, 131, 132
See application file for complete search history.

(56) References Cited

U.S. PATENT DOCUMENTS 3,137,887 A *   6/1964   Mannino ................... F16B 5/01
                                                                        16/2.1
3,339,609 A      9/1967   Cushman
(Continued)

FOREIGN PATENT DOCUMENTS

| CN | 2596090 Y | 12/2003 |
|---|---|---|
| CN | 101273207 A | 9/2008 |

(Continued)

OTHER PUBLICATIONS

International Searching Authority, International Search Report for PCT/EP2012/057622 dated Jun. 29, 2012.

(Continued)

*Primary Examiner* — Gregory Binda
*Assistant Examiner* — Nahid Amiri
(74) *Attorney, Agent, or Firm* — Ingrassia Fisher & Lorenz, P.C.

(57) ABSTRACT

A force introduction fitting for lightweight components comprises two radial force introduction faces, at least one axial force introduction face and at least one receiving means for mounting and force introduction of the force introduction fitting. The radial force introduction face and the axial force introduction face enclose a cavity. The radial force introduction face and the axial force introduction face form a one-piece component. A wall is located between the radial force introduction faces and the axial force introduction face, and extends non-parallel to the axial force introduction face, at least in portions, and comprises a bearing face for fitting a retaining face of an anchor part. A force introduction fitting of this type can be produced by using a selective laser melting method. The force introduction fitting can thus be adapted flexibly to loading conditions and has advantageous material properties and a low weight.

20 Claims, 4 Drawing Sheets

(56) References Cited

U.S. PATENT DOCUMENTS

| | | | | |
|---|---|---|---|---|
| 3,766,636 A * | 10/1973 | Sygnator | | F16B 5/01 29/525.02 |
| 3,786,611 A | 1/1974 | Brown et al. | | |
| 3,892,099 A * | 7/1975 | Worgan | | F16B 5/00 52/479 |
| 3,977,146 A * | 8/1976 | Wiley | | F16B 5/01 16/2.1 |
| 4,035,875 A | 7/1977 | Kobelt | | |
| 4,296,586 A * | 10/1981 | Heurteux | | F16B 5/01 411/338 |
| 4,717,612 A * | 1/1988 | Shackelford | | B32B 3/12 411/34 |
| 4,800,643 A * | 1/1989 | Higgins | | F16B 5/01 264/262 |
| 4,981,735 A * | 1/1991 | Rickson | | F16B 5/01 156/92 |
| 5,085,382 A | 2/1992 | Finkenbeiner | | |
| 5,168,735 A * | 12/1992 | Wang | | A44B 15/00 206/37.5 |
| 5,171,099 A * | 12/1992 | Westre | | F16B 5/01 403/264 |
| 5,536,344 A * | 7/1996 | van Dreumel | | B29C 65/0672 156/257 |
| 6,055,790 A * | 5/2000 | Lunde | | F16B 5/01 52/787.1 |
| 6,129,311 A * | 10/2000 | Welch | | B29C 70/342 239/265.31 |
| 7,182,291 B2 | 2/2007 | Westre et al. | | |
| 7,641,427 B2 | 1/2010 | Zhang | | |
| 8,220,222 B2 * | 7/2012 | Ciprian | | B64C 1/06 244/118.6 |
| 2010/0021231 A1 * | 1/2010 | Herbstreit | | F16B 12/2036 403/408.1 |
| 2012/0251235 A1 | 10/2012 | Klaukien | | |

FOREIGN PATENT DOCUMENTS

| | | |
|---|---|---|
| CN | 101292089 A | 10/2008 |
| CN | 101563544 A | 10/2009 |
| DE | 210727 A1 | 6/1984 |
| DE | 19903436 C2 | 8/2000 |
| EP | 1197669 A1 | 4/2002 |

OTHER PUBLICATIONS

State Intellectual Property Office of the People's Republic of China, Office Action in Chinese Patent Application No. 201280020444.0, mailed Dec. 3, 2014.

European Patent Office, European Office Action for European Patent Application 12 716 464.8 mailed Feb. 10, 2015.

* cited by examiner

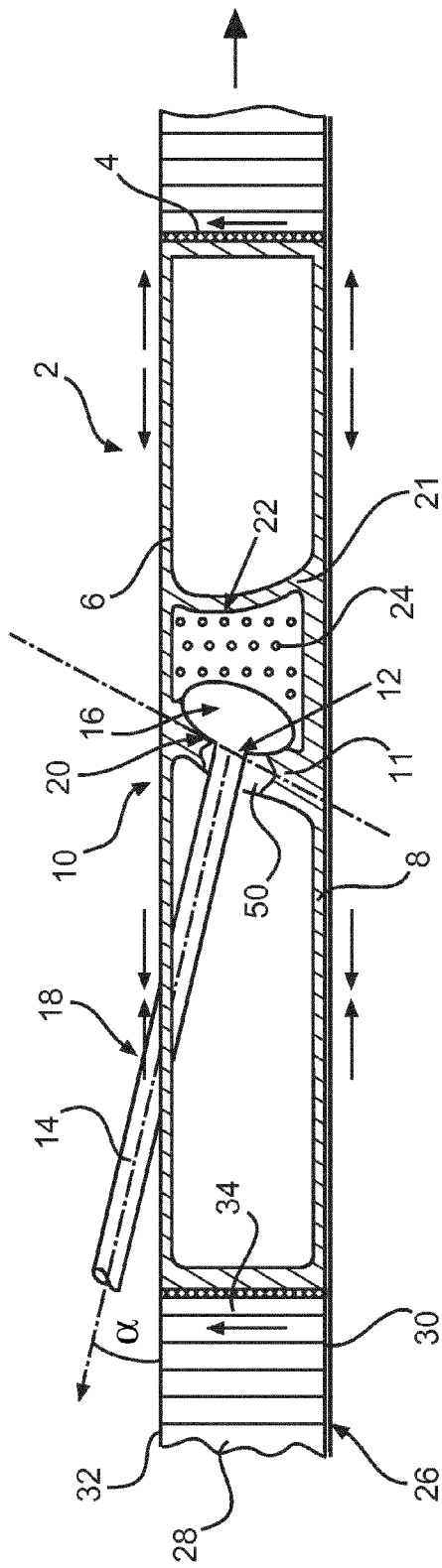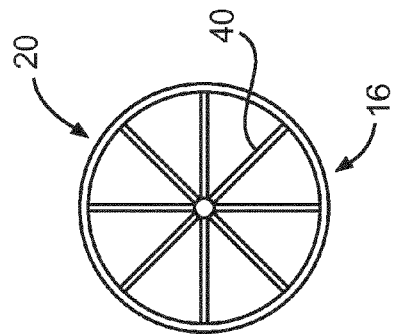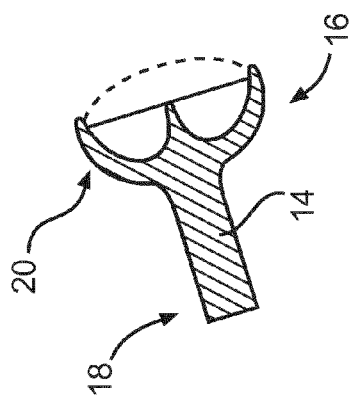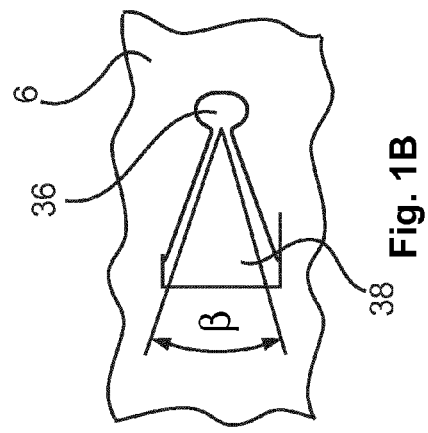

US 9,377,039 B2

FORCE INTRODUCTION FITTING FOR LIGHTWEIGHT COMPONENTS

CROSS-REFERENCE TO RELATED APPLICATIONS

This is a continuation of International Application No. PCT/EP2012/057622, filed Apr. 26, 2012, which application claims priority to German Patent Application No. 10 2011 018 526.7, filed Apr. 26, 2011, and to U.S. Provisional Patent Application No. 61/479,252, filed Apr. 26, 2011, which are each incorporated herein by reference in their entirety.

TECHNICAL FIELD

This application pertains to a force introduction fitting for lightweight components, a lightweight component comprising a force introduction fitting of this type, a method for producing a force introduction fitting of this type, the use of a force introduction fitting of this type for introducing forces into a sandwich component and an aircraft comprising fixtures comprising lightweight components which are equipped with force introduction fittings of this type.

BACKGROUND

In modern means of transport, lightweight materials which, in addition to being low in weight, also have sufficient or high strength are used for a wide range of fixtures, additions and aerodynamic auxiliary faces. Particularly in modern commercial aircraft, numerous entities inside the fuselage are produced using sandwich materials which comprise at least one core layer and one, two or more facings. Examples include the floor of a passenger cabin, a crew rest compartment and storage lockers. In relatively heavily loaded structural components made of lightweight materials in sandwich construction, it is necessary to provide dedicated force introduction points to which the structural components can be fastened in order to make it possible to transmit forces reliably.

The prior art does not provide a sufficiently reliable and simultaneously weight-saving option for introducing concentrated forces into a lightweight honeycomb-core panel, for instance via a screw connection, without providing solid core reinforcement locally at the force introduction point. This reinforcement is often provided by gluing in a solid component made of a composite material or aluminium. Alternatively, smaller forces may be transmitted into a lightweight panel having a honeycomb core, the honeycomb cells of which are filled with a honeycomb core filler.

DE 3 827 279 A1 and EP 0 354 403 B1 disclose a protective wall, configured as a lightweight component, for absorbing loads in a transport cabin of a vehicle, which wall is held on a superstructure of the aircraft fuselage via fittings. The fittings each have a relatively large face which supports the relevant lightweight component.

These known options cannot constitute a preferred solution in the context of uncompromising lightweight construction for lightweight components of this type, since the integration of one or more conventional, solid force introduction components contributes to a significant increase in the weight of the lightweight components. This is also the case for fittings which are connected to struts arranged at an angle to a cabin floor.

Other objects, desirable features and characteristics will become apparent from the subsequent summary and detailed description, and the appended claims, taken in conjunction with the accompanying drawings and this background.

SUMMARY

According to various embodiments of the present disclosure, provided is a force introduction fitting which makes it possible to introduce forces into lightweight components as harmoniously as possible, simultaneously has a low weight and is cost-effective to produce, and a method for producing such a force introduction fitting.

Another exemplary embodiment provides a force introduction fitting of this type in which the transmittable force can be adjusted by modifying the force introduction fitting, it being possible for a modification of this type to be carried out as cost-effectively as possible or at no extra cost.

Various exemplary embodiments also provide an aircraft comprising fixtures comprising lightweight components which can be mounted inside the aircraft structure with particularly low additional weight.

According to one of various aspects of the present disclosure, a force introduction fitting according to various embodiments comprises at least one axial force introduction face, two radial force introduction faces and at least one receiving means for mounting the lightweight component, the axial force introduction face and the radial force introduction faces enclosing a cavity and the force introduction fitting according to the present teachings forming a one-piece component without joints. The at least one receiving means is formed as a wall between the radial force introduction faces and enclosed by the axial force introduction face, extends non-parallel to the axial force introduction face, at least in portions, and comprises a bearing face for fitting a retaining face of an anchor means. In the region of the force introduction faces, the force introduction fitting according to the present disclosure comprises wall-like structures which may have predefined wall thicknesses and be limited outwardly by the force introduction faces.

The radial force introduction faces are generally configured to be connected in a planar, cohesive manner to the lightweight component, an adhesive connection being particularly advantageous. The force which can be transmitted to the force introduction fitting can be predefined by the size and shape of the radial force introduction faces.

The force introduction fitting according to the various teachings of the present disclosure may have any desired shape provided there are radial force introduction faces and an axial force introduction face which are capable of transmitting bearing forces from the receiving means to the lightweight component and introducing said forces into the force introduction fitting. If the lightweight component is, for example, a planar sandwich panel, then the outer dimensions of the force introduction fitting according to the present disclosure may be adapted to the thickness of the sandwich panel or of a core layer in the sandwich panel in order to be able to achieve a harmonious integration of the force introduction fitting according to various embodiments. The axial force introduction face may generally also be configured to divert forces to be applied perpendicular to the lightweight component into a shear force between the axial force introduction face and a shear core of the lightweight component, whereas the radial force introduction faces are configured to transmit compressive or tensile force components, directed parallel to the extension direction of the sandwich panel, harmoniously to said panel.

Owing to the enclosed cavity, the force introduction fitting according to various embodiments has a certain deformability, in such a way that a relatively small difference in rigidity between the force introduction fitting and the lightweight component can be provided. At the same time, the cavity reduces the weight of the force introduction fitting to a small amount, in such a way that the force introduction fitting according to the present disclosure increases the weight of the lightweight component as little as possible.

The design of the receiving means makes it possible for the force introduction fitting to absorb tensile forces extending oblique to the radial force introduction faces particularly easily. Owing to harmonious design comprising an integrated wall which extends oblique to the axial force introduction faces, the force can be introduced into the lightweight component via the entire force introduction fitting.

In addition to the function of guiding through an actuator, an opening in a radial force introduction face, which opening is necessary for the extension of the related anchor part from outside the force introduction fitting into the cavity of the force introduction fitting, also produces a connection to a medium surrounding the force introduction fitting. The medium, for example air, can thus penetrate into the cavity and ensure pressure compensation, making it suitable for use at high altitudes or in deep water.

An anchor part which can be fitted against the bearing face can comprise a bell-shaped end, on the outer surface of which the retaining face is formed. From this bell-shaped end, a rod-shaped body which is capable of introducing a tensile force can extend outwards from the force introduction fitting.

As indicated above also a plurality of receiving means may be integrated into the force introduction fitting, e.g. for the use of a plurality of anchor means that extend into different directions of the force introduction fitting and the lightweight component, respectively. Hence, one or both of the radial force introduction faces have openings for leading an anchor part through.

According to one exemplary embodiment of the force introduction fitting according to the various teachings of the present disclosure, the wall of the receiving means comprises a slit which opens into the opening, in such a way that an anchor means can extend from the side comprising the retaining face to the opposite side of the wall. The retaining face of the anchor means may thereby contact the bearing face of the receiving means in a flush, close-fitting manner on each side of the gap, while a rod-shaped body for absorbing tensile forces extends through the slit.

According to another embodiment of the present disclosure, the bearing face is curved in such a way that a tangential gradient at the bearing face changes constantly from a root region of the wall to a wall end opposite the axial force introduction face. In the case of a correspondingly shaped retaining face on the anchor part, this allows the production of a ball-and-socket joint portion, ultimately leading to the absorption of forces having a variable direction relative to the radial force introduction faces. As a result, the force introduction fitting according to various embodiments can be used for a plurality of applications having different strut angles and it is not necessary to design a separate force introduction fitting for each load case.

The best possible absorption of a tensile force is achieved in the case of perpendicular force introduction into the bearing face. To overcome an angle region in order to absorb tensile forces from a plurality of different directions, it is recommended to configure the bearing face as a segment of a spherical surface, since in this case the requirement for perpendicular force introduction can easily be met.

In one exemplary embodiment of the present disclosure, the wall of the receiving means is connected in a root region to a radial force introduction face. This results in particularly high levels of stability and rigidity of the force introduction fitting according to the present disclosure.

Alternatively or additionally, in another embodiment of the present disclosure the wall end of the receiving means is connected to the opposing radial force introduction face in such a way that the wall extends from one radial force introduction face to the radial force introduction face spaced apart therefrom, in such a way that particularly high strength is achieved for an anchor means to be received.

In one exemplary embodiment of the present disclosure, the force introduction fitting comprises a counter face which is spaced apart from the wall of the receiving means in a radial direction parallel to at least one of the radial force introduction faces and is turned towards the bearing face. An end of the anchor means may be located in the region between the bearing face and the counter face and be pressed against the bearing face by suitable means in order not to release the connection. Suitable means may be springs or resilient bodies or a combination thereof, these being inserted before or after insertion of the anchor means. If resilient bodies are used which are made, for example, of an elastomer or another suitable material, then the function of a stopper for preventing the anchor means from slipping out by closing the opening of the radial force introduction face may be performed at the same time.

In one embodiment of the present disclosure, the counter face is inclined relative to the axial force introduction face, at least in portions. The inclination is generally directed towards the bearing face, at least in one portion. In the case of a correspondingly shaped anchor part, a cross-sectional area between an inserted anchor means and the counter face can thus be reduced, as a result of which a resilient body is squeezed somewhat and prevented from falling out.

In one exemplary embodiment of the present disclosure, a radial force introduction face comprises a cut-out which opens into the opening in the radial force introduction face and extends radially outwards from a side of the receiving means opposite the side on which the bearing face is located. The cut-out widens as the distance from the receiving means increases. This allows the anchor part to be guided through in different angular positions about a vertical to the radial force introduction face comprising the opening, without damaging the force introduction fitting.

In one embodiment, the force introduction fitting according to the present disclosure is substantially disc-shaped or box-shaped. As mentioned above, the height of the force introduction fitting according to the present disclosure may be adapted to the thickness of the lightweight component, in such a way that the force introduction fitting may, for example, be integrated in a flush manner into a lightweight component configured, for example, as a sandwich panel. Owing to the disc-shaped or box-shaped design, the axial force introduction face may be configured as a cylindrical surface, while the radial force introduction faces may each be configured as a circular disc arranged on an upper and lower side of the cylindrical surface. The radial force introduction faces can be connected over their entire surface to the axial force introduction face in an integral construction without joints. Owing to a configuration of this type, the cross-section of the cavity at potential buckling points is maintained completely or at least as completely as possible upon loading with bending forces.

It is thus possible to introduce into the force introduction fitting according to the present disclosure a significantly higher bending, tensile and transverse force than would otherwise be possible in the case of a construction comprising individual components.

In one example, the force introduction fitting according to the present disclosure may have a substantially symmetrical construction. The longitudinal axis may be arranged concentrically with the receiving means. The shape of the radial force introduction face and of the axial force introduction face can be selected as desired; both round and angular shapes, i.e. polygonal shapes with or without rounded edges, can be used. The axial force introduction face shall have a shape that results from the extension between the radial force introduction faces.

The box-shaped design may therefore be based on a cylindrical (e.g. comparable to a can) shape, a cuboid shape or any other regular or irregular three-dimensional shape. Furthermore, depending on the lightweight component to be equipped, the radial force introduction faces may be substantially parallel to each other or at an angular relationship.

In one exemplary embodiment, the force introduction fitting according to the present disclosure may have a roughened surface. This allows advantageous adhesion to the lightweight component, for example between a core layer of the lightweight component and the axial force introduction face or between a facing of the lightweight component and a radial force introduction face.

In one embodiment of the force introduction fitting according to the present disclosure, the wall thickness of the force introduction fitting decreases radially outwardly, viewed from a longitudinal axis, in the region of the at least one radial force introduction face. The resilient/plastic deformability of the force introduction fitting is increased as a result, in such a way that augmented tensile and compressive forces can be directed into the lightweight component, for example into the facings of sandwich panels. Occurring transverse force thrusts which are directed into a core element are reduced, which has a positive effect on the overall strength in the composite.

In one exemplary embodiment of the force introduction fitting according to the present disclosure, reinforcing elements are arranged inside the cavity and connected to the at least one axial force introduction face and/or the at least one radial force introduction face. The reinforcing elements may have different shapes and extend in an axial direction and be formed as solid intermediate ribs, or as rod-shaped reinforcing elements which form a framework structure inside the cavity. The purpose of these reinforcing elements is to improve the force transmission between the receiving means and radial force introduction faces and the axial force introduction face. By adapting the type, shape and number of the reinforcing elements, the deformability of the force introduction fitting according to the present disclosure can be influenced, at least in part.

In one exemplary embodiment, the force introduction fitting according to the present disclosure comprises two radial force introduction faces which are formed as disc-shaped elements and are supplemented by an axial force introduction face to form a closed surface of the force introduction fitting. A very simple construction with a particularly advantageous, simple possibility of integration into an existing lightweight component is thus achieved. By predefining the individual wall thicknesses of the force introduction fitting according to the present teachings, the forces which can be absorbed by the force introduction faces arranged thereon can be dimensioned.

In one of various embodiments of the force introduction fitting according to the present disclosure, said fitting is made of a meltable material, which makes it possible to produce the force introduction fitting in interconnected layers arranged one on top of another, as described below in connection with a production method according to the various teachings of the present disclosure. Any meltable material, for example plastics material or metal, is suitable for this purpose.

After completion of the production method, granular meltable material, required for producing the force introduction fitting, can be removed from the cavity via the opening through which the anchor part would extend into the force introduction fitting according to the present disclosure. As mentioned above, the force introduction fitting can be produced in a generative layer construction method. In this case, powdered or granular meltable material is applied in layers, a laser, in one example, melting the contour of the force introduction fitting completely. Since, as a result of this production method, the unmelted granular material remains on a substrate plate until completion of the force introduction fitting, when a cavity is produced this granular material is enclosed in this cavity and removed via the opening to minimise the weight.

The meltable material may be provided as a material from the group comprising tool steel, stainless steel, steel, titanium, aluminium and iron-cobalt-nickel alloys, or alloys of mixtures of these materials, for example wrought aluminium alloys (AlZnCu, etc.), high-strength aluminium alloys such as AlMgSc, or similar alloys. Bu using these materials, which are generally used without added binding agents, it is possible to melt the materials available in the powder completely. An approximately 100% component density can be achieved as a result, in such a way that a force introduction fitting, the mechanical parameters of which correspond to the greatest possible extent to the specifications of the material, can be produced. This means that, for example when producing the force introduction fitting from a titanium alloy, the parameters underlying the corresponding titanium alloy, for example resilience, also underlie the force introduction fitting.

According to one of various aspects of the present disclosure, a force introduction fitting is produced by a generative layer construction method, in one example, by a selective layer melting method (also known by the abbreviation SLM). In this case, a wall is formed which surrounds a cavity of the force introduction fitting, at least in part. In addition, a number of reinforcing elements may be formed inside the cavity and transverse to an extension direction of the force introduction fitting, in such a way that the reinforcing elements can absorb at least portions of bending, axial and radial forces acting on a force introduction fitting. The reinforcing elements are also formed in one piece with the wall, both the wall and the reinforcing elements being produced from a meltable material by means of the layer construction method.

In this case, the force introduction fitting can be constructed layer by layer, in each case it being possible for a layer of powdered material to be applied to a previously treated part of the force introduction fitting and then melted on locally, in such a way that it can then bond thereto during subsequent hardening. For example, any desired three-dimensional geometries comprising undercuts can be produced by means of laser beams. It is thus possible to produce such an advantageous force introduction fitting, which cannot be produced in conventional mechanical or casting production.

To produce products of this type, it is generally necessary for the geometric data thereof to be provided in three dimensions and processed as layer data. From the available CAD data of the component, numerous layers are produced by what is known as "slicing". As a result, a force introduction fitting according to the present disclosure is produced, the mechanical properties of which are superior to all known force introduction fittings as regards strength and low weight.

In order to obtain optimum surface support, the force introduction fitting according to the present disclosure is constructed in an oblique manner by a laser. Accordingly, in the case of disc-shaped or box-shaped design, neither the axial force introduction face nor the radial force introduction face is located on the substrate plate.

Alternatively, to reduce the production costs and the duration of the production method, horizontal production would also be conceivable, in which the force introduction fitting is constructed not in an oblique manner, but resting in a planar manner on the substrate plate.

A lightweight component comprising at least one force introduction fitting according to the present disclosure is also provided herein.

An aircraft comprising at least one built-in entity, the built-in entity comprising at least one lightweight component comprising at least one force introduction fitting according to the present disclosure, is also provided herein. In a modern commercial aircraft, the facing of a belly fairing may be fastened to the structure of the aircraft via a plurality of force introduction fittings according to the present disclosure, for instance. In addition, many lightweight components inside the cabin of the aircraft can be fastened to the fuselage structure by force introduction fittings according to the present disclosure, for example floor plates, cabin ceiling facings, monuments or monument components, partition walls and a large number of different interior trim components.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIGS. 1A to 1D show one embodiment of a force introduction fitting according to the various teachings of the present disclosure.

DETAILED DESCRIPTION

Figure 2A:
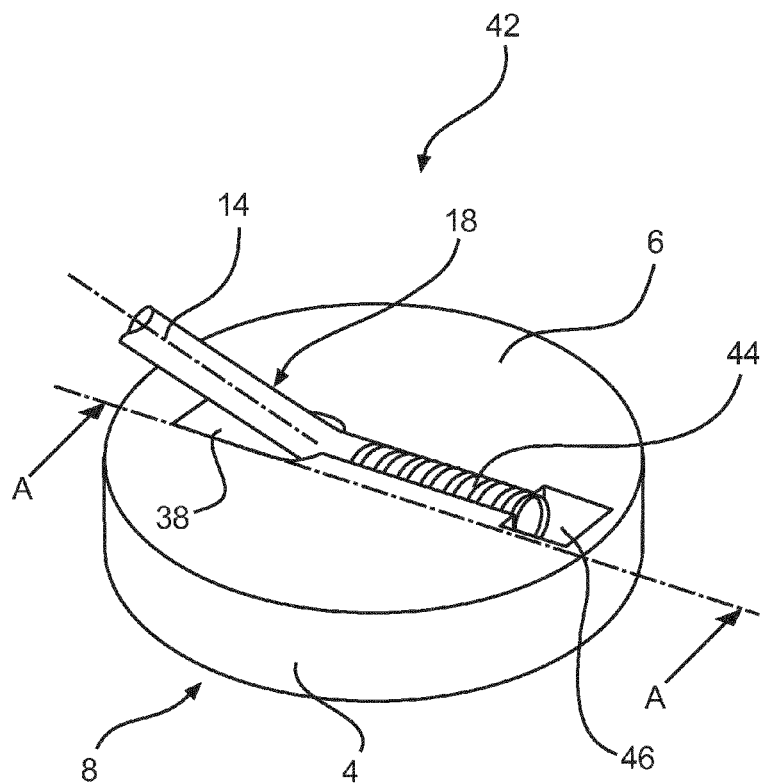
FIGS. 2A and 2B show another embodiment of a force introduction fitting according to the present disclosure in a lightweight component.

The following detailed description is merely exemplary in nature and is not intended to limit the present disclosure or the application and uses of the present disclosure. Furthermore, there is no intention to be bound by any theory presented in the preceding background or the following detailed description.

FIG. 1A is a sectional view of a force introduction fitting 2 according to various embodiments which has a box-shaped configuration comprising an axial force introduction face 4 and two radial force introduction faces 6 and 8 arranged mutually concentrically and with spacing from one another in an axial direction. Together with the axial force introduction face 4, the radial force introduction faces 6 and 8 form an integral, closed, one-piece body in the form of the force introduction fitting 2 according to the various teachings of the present disclosure. The one-piece construction of the shown force introduction fitting according to the present disclosure can be achieved by an SLM method.

The force introduction faces 4, 6 and 8 enclose a cavity in the centre of which a receiving means 10 is arranged which includes a wall 11 comprising a bearing face 12 having a curvature, the tangential gradient of which decreases substantially constantly from the lower radial force introduction face to the upper radial force introduction face. An anchor part 14 has a bell-shaped end 16 and a rod-shaped force introduction body 18. The anchor part 14 extends outwards through a slit 50 in the wall 11. The rod-shaped force introduction body 18 comprises a retaining face 20 which is formed in accordance with the bearing face 12. Owing to the curvature of the bearing face 12 and of the retaining face 20, the force introduction body 18 and the upper radial force introduction face 6 can together enclose an angle α, in such a way that it is possible to use the force introduction fitting 2 according to various embodiments variably for different strut angles for mounting a cabin monument or the like.

A wall 21, which comprises a slightly curved counter face 22 which is turned closer to the bearing face 12 in regions, is arranged with spacing from the bearing face 12 and together with the bearing face 12 encloses the bell-shaped end of the anchor part 14. In the exemplary embodiment shown, a stopper 24 made of a resilient material is arranged between said anchor part and the counter face 22, in order to push the bell-shaped end 16 towards the bearing face 12 and thereby prevent it from slipping out. A spring may also be used as an alternative to this resilient body 38; for this purpose it may be necessary to space the counter face 22 somewhat further from the anchor part 30.

A portion of a lightweight component 26 can be seen somewhat further to the left in FIG. 1A, which lightweight component comprises a core layer 28, which for example contains a honeycomb core, and two facings 30 and 32, which outwardly cover the core layer 28. The lightweight component 26 further comprises a receiving face 34 having a shape which corresponds to the axial force introduction face 4 of the force introduction fitting 2. As a result, the force introduction fitting 2 according to the present disclosure can fit closely against the lightweight component 26 and be rigidly connected to the lightweight component 2 by a suitable connection means, for example an adhesive. The strength of a connection of this type is predefined mainly by the size of the axial force introduction face 4 and the receiving face, corresponding thereto, of the lightweight component 26. A force introduction fitting according to the present disclosure may accordingly be adapted to a force to be absorbed by dimensioning the axial force introduction face 4. The use of an SLM method to produce the force introduction fitting 2 according to the present disclosure thus generates barely measurable additional costs.

The force introduction fitting 2 according to various embodiments is generally configured in such a way that the axial force introduction face 4 extends in a longitudinal direction of the force introduction fitting 2 according to the present disclosure, over the same height as the core layer 28, in such a way that the force introduction fitting 2, together with the core layer 28, can be covered by the two facings 30 and 32 in a flush manner. The force introduction fitting 2 and the lightweight component 26 thus form an integral component. For this purpose, each of the force introduction faces 4, 6 and 8 is generally provided with a roughened surface, so that particularly good adhesion to the core layer 28 and the facings 30 and 32 can be achieved via a suitable connection means.

The loading arrows at the sides of the force introduction faces 2, 4 and 6 show by way of example the type of load or stress which the force introduction fitting 2 introduces into the lightweight component 26.

A plan view in FIG. 1B shows that an opening 36, which extends into a widening cut-out 38 having a cut-out angle β, is arranged in the upper radial force introduction face 6. The anchor part 14 can be inserted into the force introduction fitting 2 according to various embodiments through the opening 36 and allows by way of the cut-out a variable load introduction angle of a plane parallel to the upper radial force introduction face 6. Owing to the angular offset, not only can the force introduction element 2 be used for different load cases, but it also reliably protects against damage which would result from imprecise linear force introduction.

As shown in FIG. 1C, the bell-shaped end region 16 of the anchor part 14 is, in one example, hollow in part, in such a way that a favourable weight of the anchor part 14 is achieved. The rod-shaped body 18, via which a tensile force can be introduced with the aid of screw means or the like, extends seamlessly up to the bell-shaped end region.

To save weight, a number of reinforcing ribs 40 can, as shown in FIG. 1D, be arranged in the bell-shaped end region 16, in such a way that the required wall thickness can be reduced. The anchor part 14 or at least the bell-shaped end region 16 may also be produced via the SLM method, or alternatively by a casting method.

All the wall thicknesses of the force introduction fitting 2 can also be variable for adaptation to the occurring load cases, in such a way for example that the thicknesses of the radial force introduction faces 4 and 6 decrease radially outwards. The wall thicknesses may be on average for example in the region of about 2-10% of the total height of the force introduction fitting 2. The use of an SLM method to produce the force introduction fitting 2 according to various embodiments thus generates no measurable additional costs.

FIG. 2A shows another exemplary embodiment of a force introduction fitting 42 according to the present disclosure, in which the stopper 24 is replaced by a compression spring 44. In this case, the anchor part 14 can be inserted into the force introduction fitting 42 through an insertion opening 46 and displaced to the bearing face 12. The space between the insertion opening 46 and the bell-shaped end 16 of the anchor part 14 is then used to receive the compression spring 44. The advantage of this arrangement lies in the relatively great displaceability of the anchor part for absorbing impulses on the rod-shaped force introduction body 18.

Figure 2B:
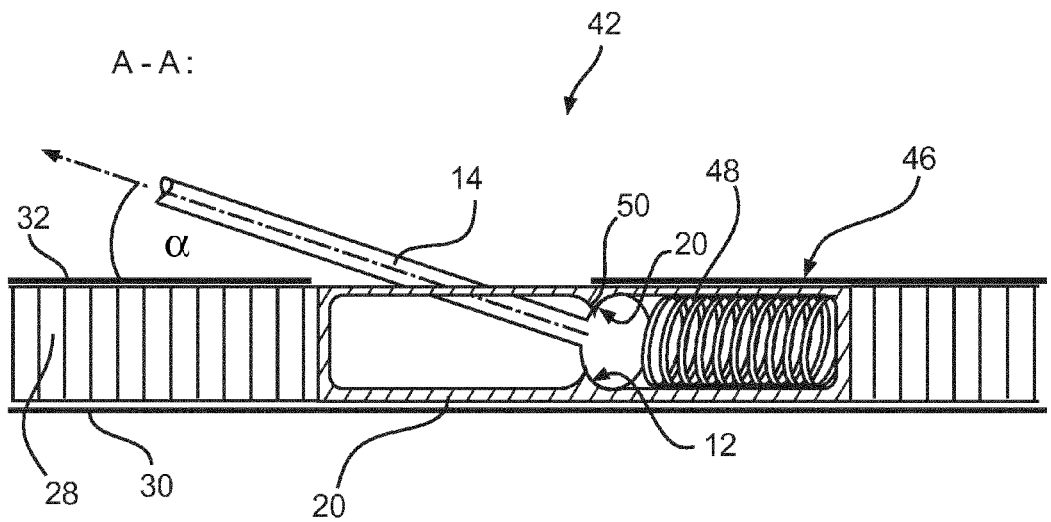

FIG. 2B is a sectional view of a receiving space 48 in which the compression spring 44 will be arranged when it is inserted through the insertion opening 46. The bearing face 12 is not visible in this view, since a slit 50 is arranged centrally in the bearing face 12 for guiding through the rod-shaped load introduction body 18, and the section shown in FIG. 2B also extends centrally along the force introduction body 42. As a result, only one retaining face 20 of the anchor part 14 is visible.

Figure 3:
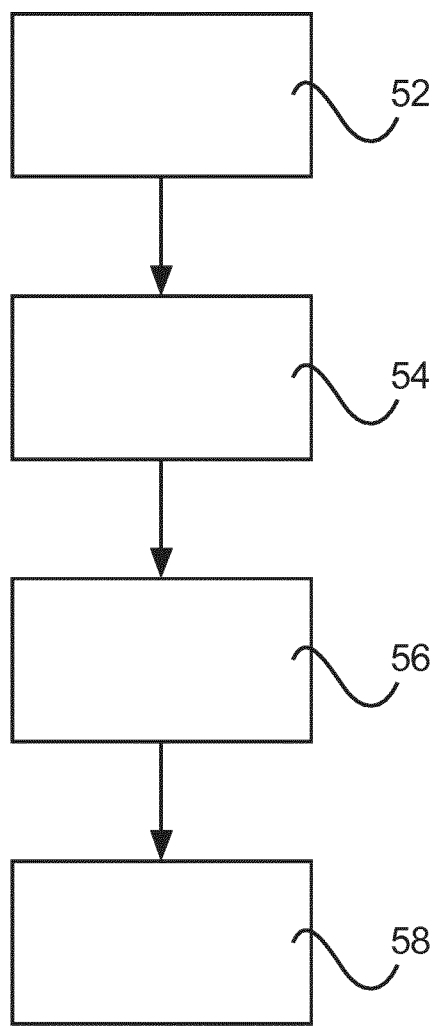
FIG. 3 is a schematic representation of a method according to various embodiments.

FIG. 3 shows the production method according to the various teachings of the present disclosure. The force introduction fitting according to various embodiments is produced by a selective laser melting method (SLM method). In this context, the force introduction fitting is produced by means of numerous layers by what is known as "slicing" on the basis of available CAD data, resulting in a one-piece component.

A powder or granular material is applied 52, for example by means of a blade, over the entire surface of a construction platform in a thickness of about 0.001 to about 0.2 mm and, in one example, about 10 μm to about 80 μm. The layers are melted 54 into the powder bed in steps in accordance with the "sliced" contour of the support by actuating a suitable laser beam. A substrate platform is subsequently lowered slightly 56 and a new layer of the powder is then put on. The powder is provided by raising a powder platform or as a supply in the blade. The layer construction takes place vertically. The energy supplied by the laser is absorbed by the powder and results in locally limited melting of powder particles.

Since the SLM method involves the individual layers being melted into a powder bed by actuation of a laser beam, powder remains in cavities and is removed 58 through corresponding openings after completion.

For example, an aluminium alloy AlZn6MgCu, AlZn5, 5MgCu or AlZn6CuMgZr, an AlMgSc-based alloy, a high-strength steel or stainless steel such as Al7Cr-4Ni-3Cu or else a titanium alloy TiAl6V4 may be used as a material for producing the force introduction fitting according to the present disclosure.

Figure 4:
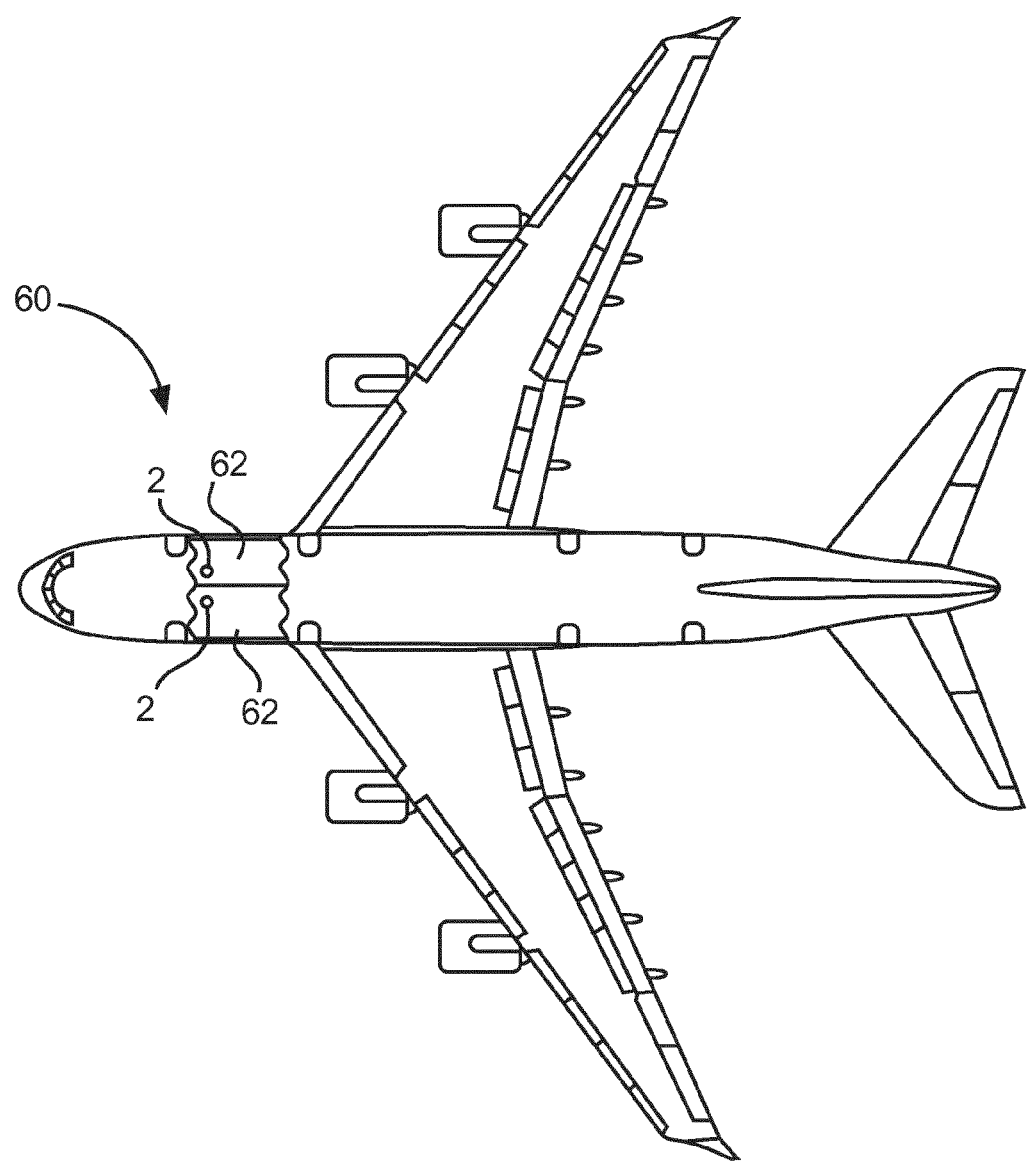
FIG. 4 shows an aircraft comprising at least one built-in entity comprising at least one lightweight component which comprises at least one force introduction fitting according to various embodiments.

Finally, FIG. 4 shows an aircraft 60 which comprises in the aircraft fuselage a plurality of built-in entities 62 which are provided by means of lightweight components 26, these lightweight components for example each being equipped with at least one force introduction fitting 2, 32 according to various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A force introduction fitting for lightweight components, the force introduction fitting comprising:
   two disc-shaped radial force introduction plates;
   an axial force introduction surface in a form of a cylinder jacket having a first end and a second end, with one of the two disc-shaped radial force introduction plates connected to the first end and the other of the two disc-shaped radial force introduction plates connected to the second end, the second end being opposite to the first end;
   an anchor part; and
   at least one receiving means for mounting the anchor part, wherein the radial force introduction plates and the axial force introduction surface enclose a cavity, and
   wherein the force introduction fitting is formed as a one-piece component without joints, and the at least one receiving means is formed as a wall between and attached to at least one of the radial force introduction plates and is enclosed by the axial force introduction surface, extends non-parallel to the axial force introduction surface, at least in portions, and comprises a bearing face for fitting a retaining face of the anchor part, wherein the anchor part extends through an opening in one of the two disc-shaped radial force introduction plates to the outside.

2. The force introduction fitting according to claim 1, further comprising an opening defined in one of the radial force introduction plates, which opening is accessible from outside and extends from outside of the force introduction fitting into the cavity of the force introduction fitting.

3. The force introduction fitting according to claim 2, wherein at least one of the radial force introduction plates comprises a cut-out which opens into the opening in the one of the radial force introduction plates and extends radially outwards from a side of the receiving means opposite the side on which the bearing face is located.

4. The force introduction fitting according to claim 1, wherein the anchor part comprises a bell-shaped end, on the outer surface of which the retaining face is formed.

5. The force introduction fitting according to claim 1, wherein the wall of the receiving means comprises a slit.

6. The force introduction fitting according to claim 5, wherein the slit opens into the opening.

7. The force introduction fitting according to claim 1, wherein the bearing face is curved and a tangential gradient at the bearing face changes constantly from a root region of the wall to an opposite end of the wall.

8. The force introduction fitting according to claim 1, wherein the bearing face is a segment of a spherical surface.

9. The force introduction fitting according to claim 1, wherein a root region of the wall is connected to at least one of the radial force introduction plates.

10. The force introduction fitting according to claim 1, further comprising a counter face which is spaced apart from the wall of the receiving means in a radial direction parallel to at least one of the radial force introduction plates and is turned towards the bearing face.

11. The force introduction fitting according to claim 10, wherein the counter face is inclined relative to the at least one axial force introduction face, at least in portions.

12. The force introduction fitting according to claim 1, wherein the force introduction fitting is produced by a generative layer construction.

13. A lightweight component, comprising:
at least one core layer;
at least one facing; and
at least one force introduction fitting including two disc-shaped radial force introduction plates, an axial force introduction surface in a form of a cylindrical jackets having a first end and a second end, with one of the two disc-shaped radial force introduction plates connected to the first end and the other of the two disc-shaped radial force introduction plates connected to the second end, the second end being opposite to the first end; an anchor part; and at least one receiving means for mounting the anchor part; wherein the radial force introduction plates and the axial force introduction surface enclose a cavity, wherein the force introduction fitting is formed as a one-piece component without joints, with the at least one receiving means formed as a wall between and attached to at least one of the radial force introduction plates and is enclosed by the axial force introduction surface, the at least one receiving means extending non-parallel to the axial force introduction surface, at least in portions, and including a bearing face for fitting a retaining face of the anchor part, and wherein the anchor part extends through an opening in one of the two disc-shaped radial force introduction plates to the outside;
wherein the lightweight component comprises a receiving face, formed in accordance with the at least one axial force introduction face, for fitting against the axial force introduction surface of the force introduction fitting, and
wherein an extension of the force introduction fitting is configured for flush coverage of the core layer and of the force introduction fitting fitted against the core layer.

14. The lightweight component according to claim 13, wherein the lightweight component is a fixture in an aircraft.

15. An aircraft, comprising:
at least one built-in entity, which includes at least one lightweight component comprising at least one force introduction fitting for mounting the lightweight component, the force introduction fitting and including:
two disc-shaped radial force introduction plates;
an axial force introduction surface in a form of a cylinder jacket having a first end and a second end, with one of the two disc-shaped radial force introduction plates connected to the first end and the other of the two disc-shaped radial force introduction plates connected to the second end, the second end being opposite to the first end; an anchor part; and at least one receiving means for mounting the anchor part,
wherein the radial force introduction plates and the axial force introduction surface enclose a cavity,
wherein the force introduction fitting is formed as a one-piece component without joints, and the at least one receiving means is formed as a wall between and attached to at least one of the radial force introduction faces and is enclosed by the axial force introduction surface, extends non-parallel to the axial force introduction surface, at least in portions, and comprises a bearing face for fitting a retaining face of the anchor part, and
wherein the anchor part extends through an opening in one of the two disc-shaped radial force introduction plates to the outside.

16. The aircraft according to claim 15, further comprising an opening defined in one of the radial force introduction faces, which opening is accessible from outside and extends from outside of the force introduction fitting into the cavity of the force introduction fitting.

17. The aircraft according to claim 15, wherein the anchor part comprises a bell-shaped end, on the outer surface of which the retaining face is formed.

18. The aircraft according to claim 15, wherein the wall of the receiving means comprises a slit.

19. The aircraft according to claim 18, wherein the slit opens into the opening.

20. The aircraft according to claim 15, wherein the force introduction fitting is produced by a generative layer construction.

* * * * *